UNITED STATES PATENT OFFICE.

WILHELM HERZBERG, OF SCHÖNEBERG, NEAR BERLIN, GERMANY, ASSIGNOR TO ACTIEN GESELLSCHAFT FÜR ANILIN FABRIKATION, OF BERLIN, GERMANY.

MONOAZO DYES FOR WOOL.

987,362.   Specification of Letters Patent.   Patented Mar. 21, 1911.

No Drawing.   Application filed December 12, 1910.   Serial No. 596,883.

*To all whom it may concern:*

Be it known that I, WILHELM HERZBERG, a citizen of the German Empire, residing at Schöneberg, near Berlin, Germany, my post-office address being Landshuterstrasse 24, Schöneberg, near Berlin, Germany, have invented certain new and useful Improvements in Monoazo Dyes for Wool, of which the following is a specification.

According to my present invention the hitherto unknown ortho-aminoazo bodies of the following general formula:

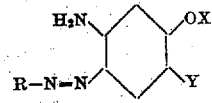

(R meaning an aryl- or alkaryl-group) can be obtained by combining a diazo compound with ortho-substituted meta-aminophenol ethers of the following general formula:

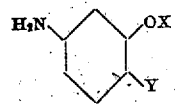

in which formula X signifies an alkyl group or the radical of acetic acid: $CH_2COOH$ and Y signifies an alkyl group, an oxyalkyl group, an acidylamino group, a halogen, the sulfonic group and the like. In order to obtain the new azo dyes the combination of the diazo compound with the respective ortho-substituted meta-amidophenol ether is performed in acid solution, that is to say for example in the presence of acetic acid. It is very surprising that in this way the formation of diazoamino bodies does not occur and that even diazo compounds, which generally do not strongly combine, produce the new dyes with a good yield, the azo group entering into the benzene nucleus in the ortho position to the amido group.

Among the great number of dyes which may be obtained according to the present invention I claim those which result from the combination of picramic acid and ortho-alkyloxy-para-toluidin:

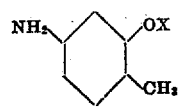

or meta-alkyloxy-para-chloroanilin:

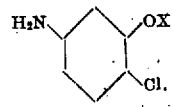

These new dyes are more especially adapted for dyeing wool in the presence of oxidizing chromium compounds; in this way are obtained olive tints which are very fast to milling and potting and possess a very great solidity against the action of light.

The following example may serve to illustrate my invention, the parts being by weight: 19.9 parts of picramic acid are diazotized in the usual manner by means of 6.9 parts of sodium nitrite (of 100 per cent. strength). The diazo compound thus obtained in suspension is introduced into a solution of 15.3 parts of ortho-ethoxy-para-toluidin

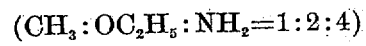

in 12 parts of hydrochloric acid of 20° Baumé specific gravity. To the mass while stirring a solution of 14 parts of sodium acetate is gradually introduced. As soon as the reaction is complete, sodium carbonate is added until alkaline solution occurs, whereupon the dye is separated by the addition of common salt. The dye is then isolated by draining and dried. The new dye thus obtained forms in the dry and pulverized shape a reddish-brown powder, which easily dissolves in hot water to a claret solution; on adding concentrated soda-lye to the aqueous solution reddish-brown flakes are separated, whereas the addition of concentrated hydrochloric acid effects the precipitation of brown flakes.

The new dye is rather soluble in alcohol to a claret solution; in concentrated sulfuric acid it dissolves to a bluish-red solution which on the addition of ice turns to claret. By the action of strong reducing agents, such as stannous chlorid and hydrochloric acid, the dye is split up thus yielding tri-amidophenol besides diamidocresol ethyl ether.

It is obvious to those skilled in the art that my present invention is not limited to the foregoing example or to the details given therein. Thus, for instance, instead of combining the diazo compound of picramic acid with ortho-ethoxy-para-toluidin as given in the above example, I also combine this diazo derivative with a meta-alkyloxy-para-chloroanilin, such as for instance meta-ethoxy-para-chloroanilin

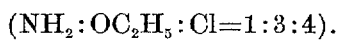

The dyes thus obtained resemble very much that of the foregoing example; they also yield olive tints which are very fast to milling and potting.

Having now described my invention and the manner in which it may be carried out, what I claim is,—

1. As new articles of manufacture the new azo dyes which may be obtained by diazotizing picramic acid and combining the diazo compound thus obtained with an ortho-substituted meta-amidophenol ether of the following general formula:

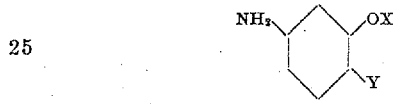

in which formula X signifies an alkyl group and Y signifies a substituent, which new dyes are more especially adapted for dyeing wool in the presence of an oxidizing chromium compound and thus yield olive tints which are very fast to milling, potting and to the action of light, and which new dyes in the form of the sodium salt, if dried and pulverized, are dark brown powders, soluble in water, these new dyes dissolving in concentrated sulfuric acid to a red to bluish-red solution, and which new dyes by the action of strong reducing agents are split up yielding thus triamidophenol besides an amido derivative of a meta-amidophenol ether.

2. As a new article of manufacture the hereinbefore-described new azo dye which may be obtained by diazotizing picramic acid and combining the diazo compound thus obtained with ortho-ethoxy-para-toluidin

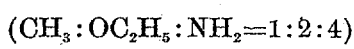

in an acid solution, which new dye is more especially adapted for dyeing wool in the presence of an oxidizing chromium compound and thus yields an olive tint which is very fast to milling, potting and to the action of light, and which new dye in the form of the sodium salt in the dry and pulverized shape forms a reddish-brown powder which easily dissolves in hot water to a claret solution which aqueous solution on adding concentrated soda-lye separates reddish-brown flakes, whereas the addition of concentrated hydrochloric acid effects a precipitation of brown flakes, this new dye being rather soluble in alcohol to a claret solution, and which new dye dissolves in concentrated sulfuric acid to a bluish-red solution which on the addition of ice turns to claret, and this new dye by the action of strong reducing agents, such as stannous chlorid and hydrochloric acid, being split up yielding triamidophenol besides diamidocresol ethyl ether.

In testimony whereof I have hereunto set my hand in presence of two subscribing witnesses.

WILHELM HERZBERG.

Witnesses:
 HENRY HASPER,
 WOLDEMAR HAUPT.